United States Patent [19]

Tetsugu et al.

[11] 4,015,180
[45] Mar. 29, 1977

[54] SPEED REGULATING DEVICES FOR ROTARY MACHINES OR THE LIKE

[75] Inventors: Yoshio Tetsugu, Katano; Tsunemi Mitsui, Osaka; Hiroshi Minakuchi, Kadoma, all of Japan

[73] Assignee: Matsushita Electric Industrial Co., Ltd., Japan

[22] Filed: Feb. 21, 1975

[21] Appl. No.: 551,751

[30] Foreign Application Priority Data

Mar. 8, 1974 Japan ............................. 49-27532

[52] U.S. Cl. ............................. 318/314; 318/318; 318/341
[51] Int. Cl.² .......................................... H02P 5/06
[58] Field of Search .......... 318/314, 318, 341, 327, 318/317, 392

[56] References Cited

UNITED STATES PATENTS

| 3,569,808 | 3/1971 | Goto | 318/314 |
| 3,806,786 | 4/1974 | Inaba | 318/318 X |
| 3,821,604 | 6/1974 | Walrauen | 318/314 X |
| 3,845,375 | 10/1974 | Stiebel | 318/327 X |
| R28,567 | 10/1975 | Matthey et al. | 318/318 X |

*Primary Examiner*—B. Dobeck
*Attorney, Agent, or Firm*—Burgess, Ryan and Wayne

[57] ABSTRACT

A first physical quantity derived from a detector coupled to a rotary machine is combined with a first reference physical quantity to produce a rectangular waveform signal with an amplitude which changes in response to the variation in supply voltage. The rectangular waveform signal is converted into a second physical quantity and is compared with a second reference physical quantity derived by the division of a supply voltage to produce control signals for rotating the rotary machine at a predetermined rate.

6 Claims, 13 Drawing Figures

SPEED REGULATING DEVICES FOR ROTARY MACHINES OR THE LIKE

BACKGROUND OF THE INVENTION

The present invention relates to speed regulating devices for rotary machines or the like.

In conventional speed regulating devices, the output from a tachometer such as a generator coupled to the driving shaft of a motor is converted by a waveshaping circuit into trigger pulses which, in turn, are converted by a waveform converting circuit into rectangular waveform signals with a predetermined time interval $T_s$ and a pulse repetition rate which changes in response to the frequency of the output from the generator. The rectangular waveform output signals are smoothed by a smoothing circuit, and in response to the output from the smoothing circuit, a driving circuit controls the motor so as to rotate at a predetermined rate. The conventional speed regulating devices have, however, an inherent limitation in that the control of the rotational speed of a rotary machine or the like with a high degree of accuracy cannot be attained, because the output voltage from the driving circuit changes in response to variations in supply voltage.

To overcome this problem, a system has been devised and demonstrated in which a voltage regulator is connected to the output of the waveshaping circuit, so that the stable voltage may be applied to the waveform converting circuit in the next stage. However, when the supply voltage changes over a wide range, the output from the driving circuit also changes slightly, and the output voltage from the voltage regulator also changes. Therefore, it is difficult to control the rotational speed of the rotary machines with a high degree of accuracy. In conventional speed regulating devices, the gain of the driving circuit must be considerably increased if the control with a high degree of accuracy is desired.

SUMMARY OF THE INVENTION

In view of the above, one of the objects of the present invention is to provide a speed regulating device capable of stably controlling the rotational speed of a rotary machine with a high degree of accuracy.

Another object of the present invention is to provide a speed regulating device capable of providing stable control of the rotational speed of a rotary machine in spite of variations in supply voltage.

A further object of the present invention is to provide a speed regulating device which has a plurality of reference physical quanties so that a high loop gain of the control system may be obtained, to control the rotational speed of a rotary machine with a high degree of accuracy.

A further object of the present invention is to provide a speed regulating device capable of changing the rotational speed of a rotary machine depending upon a plurality of reference physical quantities, or parameters, so that the rotational speed may be switched, or changed over a wide range.

Briefly stated, a speed regulating device for rotary machines in accordance with the present invention is characterized by the provision of means for deriving a first physical quantity such as a frequency, a period in terms of time or the reciprocal of time, from a tachometer, such as a generator coupled to a rotary machine; means for combining the first physical quantity with a first reference physical quantity, so as to generate a rectangular waveform signal whose amplitude changes in response to variations in supply voltage; means for smoothing and converting the rectangular waveform signal into a second physical quantity; comparator means for comparing said second physical quantity with a second reference physical quantity derived by the division of the supply voltage; and means for controlling the rotary machine or the like so as to rotate in a predetermined rate in response to the output from the comparator means.

DESCRIPTION OF THE PREFERRED EMBODIMENTS:

Prior Art, FIGS. 1 through 6

Figure 1:
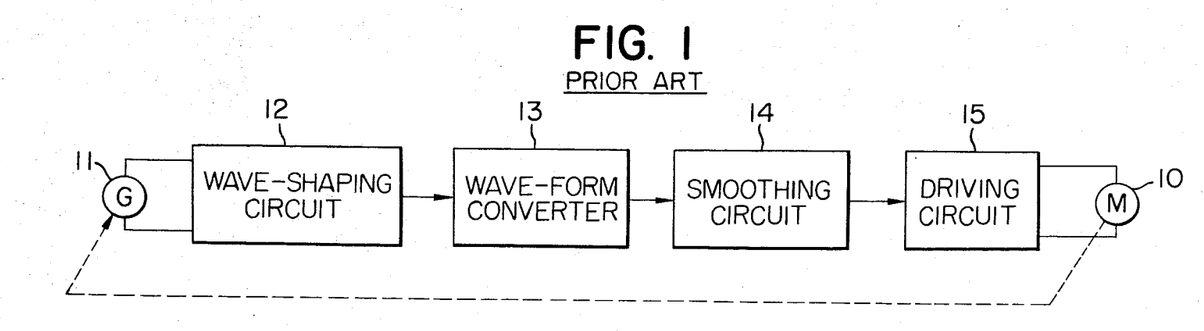
FIG. 1 is a block diagram of a conventional speed regulating device for rotary machines.

Prior to the description of the preferred embodiments of the present invention, a conventional speed regulator for an electric motor will be described in order to more specifically point out the limitation thereof. First referring to FIG. 1 illustrating in block diagram the conventional speed regulator, the output of a generator 11 which is mechanically coupled to a motor 10 to be controlled, is applied to the input terminals of a waveshaping circuit (trigger pulse generator) 12, and the output from the waveshaping circuit 12 is applied to the input terminal of a waveform converter 13 which, in turn, generates the rectangular waveform signals with a predetermined time interval $T_S$ and with a pulse spacing which is depending upon the repetition rate of the input signal. The output from the waveform converter 13 is applied to the input terminal of a smoothing circuit 14, connected to a driving circuit 15, connected to the motor 10. The circuits 12–15 shown in FIG. 1 may be of the conventional type, but in order to facilitate the understanding of the preferred embodiments of the present invention to be described hereinafter, they will be described in detail hereinafter with reference to FIGS. 2, 3, 4 and 5.

Figure 2:
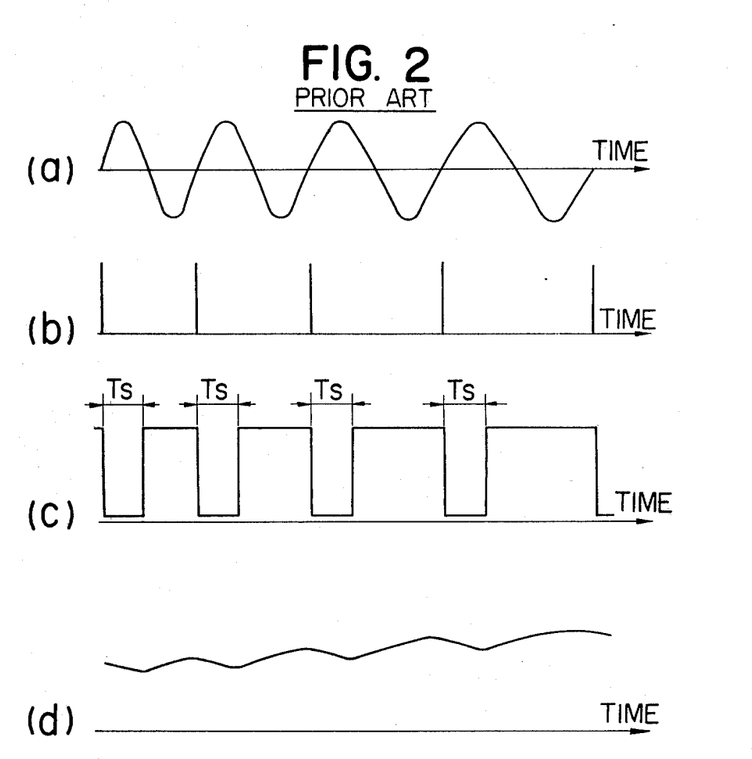
FIG. 2 shows waveforms obtained at various points in the circuit shown in FIG. 1.
Figure 3:
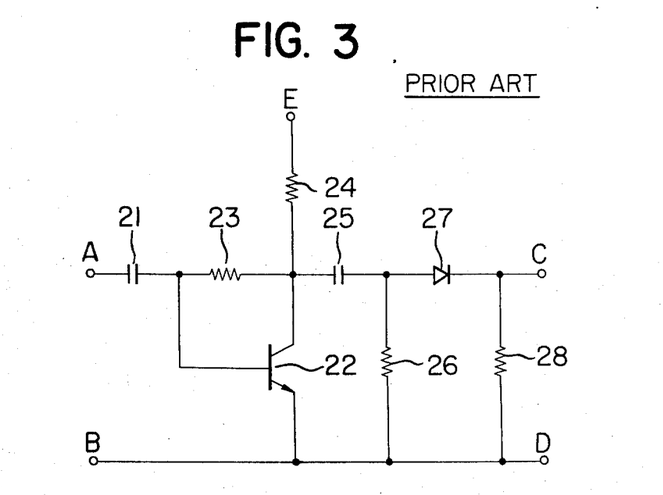
FIG. 3 is a detailed diagram of a waveshaping circuit shown in FIG. 1.

The details of te waveshaping circuit 12 are shown in FIG. 3. To the input terminals A and B thereof is applied the output signal from the generator 11 as the waveform shown in FIG. 2a. A transistor 22 and resistors 23 and 24 form an amplifier-limiter, and the input signal applied to the input terminal A is applied through a coupling capacitor 21 to the base of the transistor 22. The collector of the transistor 22 is connected through the resistor 24 to a power supply E. Therefore, a rectangular waveform signal with the same pulse repetition rate with the frequency of the input signal (See FIG. 2a ) is derived from the collector of the transistor 22, and is differentiated by a differentiation circuit consisting of a capacitor 25 and a resistor 26. The output of the differentiation circuit is detected by a detector circuit consisting of a diode 27 and a resistor 28 so that only an output signal with positive polarity may be derived across the output terminals C and D as shown at b in FIG. 2. The output of the waveshaping circuit 12 is applied to the waveform converter 13.

Figure 4:
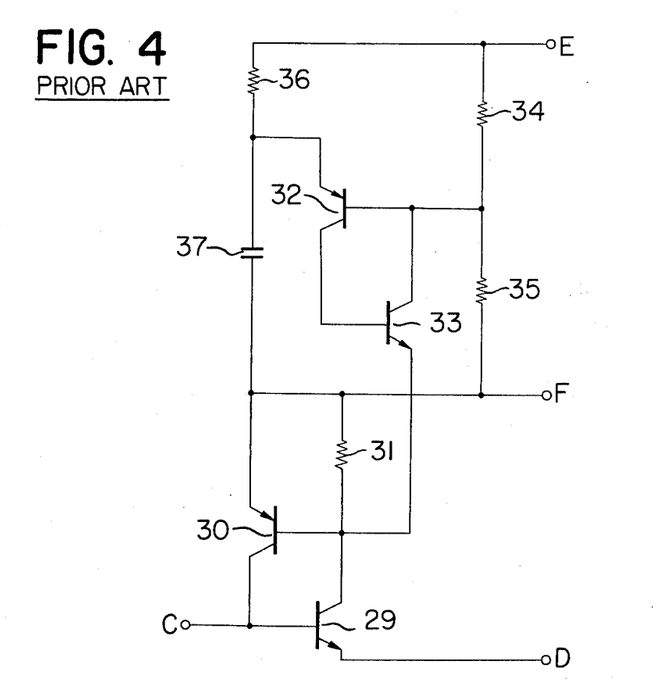
FIG. 4 is a detailed diagram of a waveform converting circuit shown in FIG. 1.

The details of the waveform converter 13 are shown in FIG. 4. The input terminals C and D are connected to the corresponding output terminals C and D of the waveshaping circuit 12. Transistors 29 and 30, and a resistor 31 make up a hook switch, and the input terminal C is connected to the base of the transistor 29, whose emitter is connected to an output terminal F. The input terminal D is connected to the emitter of the transistor 29.

Transistors 32 and 33, resistors, 34, 35 and 36 and a capacitor 37 make up a timing pulse generator. The emitter of the transistor 33 is connected to the base of the transistor 30 and to the collector of the transistor 29; the collector of transistor 33 is connected to the base of the transistor 32 and to the junction between the series-connected resistors 34 and 35 which, in turn, are connected to the power supply terminal E and the output terminal F, respectively. The collector of the transistor 32 is connected to the base of the transistor 33, and the emitter of transistor 32 is connected through the resistor 36 to the power supply terminal E, and through the capacitor 37, to the output terminal F.

Next the mode of operation of the waveform converter circuit 13 comprising the hook switch and the timing pulse generator circuit will be described. The hook switch is turned on when a positive trigger pulse is applied to the base of the transistor 29 so that the voltage is applied to the timing pulse generator circuit. Therefore, the capacitor 37 is charged through the resistor 36, and when the voltage across the capacitor 37 exceeds the sum of the voltage across the resistor 35 and the forward base-emitter voltage of the transistor 32, the base current flows into the transistor 32, so that the collector current flows through the base and emitter of the transistor 33, and, through the collector and emitter of the transistor 29. Therefore, the through transistors 32 and 33, are immediately turned on.

The time interval $T_S$ from the time when the hook switch is turned on to the time when the transistors 32 and 33 are turned on may be obtained as follows:

$$V_C = (E_o - V_H)\left(1 - \epsilon^{-\frac{T_S}{R_3 C_4}}\right) \quad (1)$$

$$V_C = (E_o - V_H)\left(\frac{R_2}{R_1 + R_2}\right) + V_{BE} \quad (2)$$

From Eqs. (1) and (2), $$T_S = -R_3 C_4 \ln\left\{1 - \frac{R_2}{R_1 + R_2} - \frac{V_{BE}}{E_o - V_H}\right\} \quad (3)$$

where
- $E_o$ : voltage at terminal E;
- $R_1$, $R_2$ and $R_3$ : values of resistors 34, 35 and 36;
- $C_4$ : value of capacitor 37;
- $V_{BE}$: forward base-emitter voltage of transistor 32;
- $V_H$ : saturation voltage of hook switch; and
- $V_C$ : voltage charge across capacitor 37 when base current flows into transistor 32.

When the transistors 32 and 33 are turned on, the capacitor 37 is discharged through the transistors 32 and 33, and through the collector and emitter of the transistor 29, so that the potential at the base of the transistor 30 rises in the positive direction, while the base current of the transistor 30 is interrupted. As a result, the base current of the transistor 29 is also interrupted, so that the hook switch is turned off. Thus, the potential at the output terminal F remains substantially at zero during the time interval $T_S$ given by Eq. (3) from the time when the trigger pulse (FIG. 2b) is applied to the input terminal C of the converter circuit 13. Therefore, the output signal waveform shown at c in FIG. 2 is derived from the output terminal F, and is applied to the smoothing circuit 14.

Figure 5:
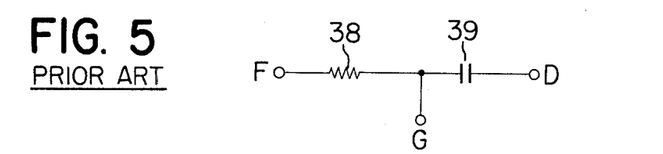
FIG. 5 is a detailed diagram of a smoothing circuit shown in FIG. 1.

The details of the smoothing circuit 14 are shown in FIG. 5. The input terminal F is connected to the output terminal F of the converter circuit 13. A resistor 38 and a capacitor 39 make up an integrator, so that in response to the input signal (See FIG. 2c) applied to the input terminal F, the output signal in the waveform indicated at d in FIG. 2 is derived from an output terminal G, and is applied to an input terminal G of the driving circuit 15 whose detailed circuit diagram is shown in FIG. 6.

Figure 6:
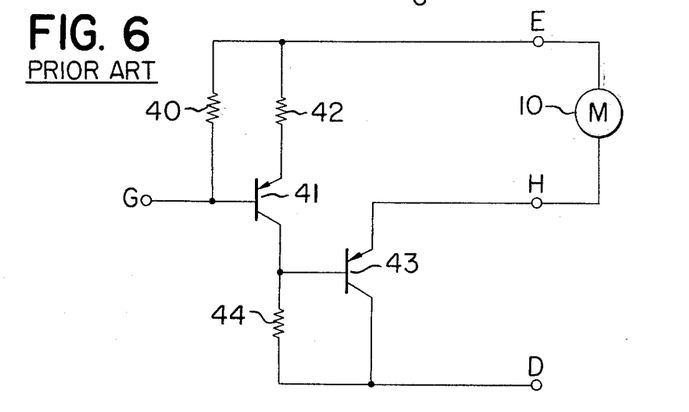
FIG. 6 is a detailed diagram of a driving circuit shown in FIG. 1.

Referring next to FIG. 6, the input terminal G of the driving circuit 15 is connected to the output terminal G of the smoothing circuit 14, and the motor 10 is connected between the power supply terminal E and the output terminal H. The terminal D is a negative terminal. The input terminal G is connected through a resistor 40 to the power supply terminal E and to the base of a transistor 41. The collector of the transistor 41 is connected to the base of a transistor 43 and to the negative terminal D through a resistor 44. The emitter of the transistor 43 is connected to the output terminal H, while the collector is connected to the negative terminal D and to the resistor 44. The emitter of the transistor 41 is connected through a resistor 42 to the power supply terminal E.

When the potential at the input terminal G rises, the collector current of the transistor 41 decreases, so that the voltage across the resistor 44 drops. As a result, the base potential of the transistor 43 also drops, so that the voltage across the motor 10 increases. Therefore the rotational speed of the motor 10 increases. On the other hand, when the potential at the input terminal G drops, the operation is reversed; that is, the motor speed decreases.

Referring back to FIG. 1, the overall operation of the speed regulator will be investigated. When the rotational speed of the motor 10 gradually decreases due to the increase in load or the like, the frequency of the output signal from the generator 11 also gradually decreases as indicated at $a$ in FIG. 2. As a result, the output from the driving circuit 15 gradually increases as shown in FIG. 2$d$, so that the rotational speed of the motor 10 increases to a desired rate. On the other hand, when the rotational speed of the motor 10 increases, the speed regulator decreases it to a desired rate. Thus, if the loop gain of the speed regulator is sufficiently high, the rotational speed of the motor 10 may be maintained at a desired rate.

The frequency $f$ of the output signal from the generator 11 is in proportion to the rotational speed $N$ of the motor 10. Therefore, $$f = K \cdot N \tag{4}$$

where $K$ = proportionality constant.

The output voltage $E_M$ produced by converting the output signal with a frequency $f$ into a rectangular waveform signal, which is maintained at a level $E_1$ during $T_S$, and by completely smoothing the rectangular waveform signal by the integrator, is given by $$E_M = K \cdot N \cdot E_1 \cdot T_S \tag{5}$$

In the waveform converter circuit 13 shown in FIG. 4,
$$E_1 = E_o - V_{II} \tag{6}$$

From Eqs. (3), (5) and (6), we have $$E_M = -K \cdot N \cdot R_3 \cdot C_4 \cdot (E_o - V_{II}) \ln \left\{ 1 \frac{R_2}{R_3 + R_2} - \frac{V_{BE}}{E_o - V_{II}} \right\} \tag{7}$$

Thus, the motor 10 is controlled in response to the output $E_M$ from the driving circuit 15 obtained from Eq. (7). However, as is clear from Eq. (7), when the power supply voltage $E_o$ changes, the output voltage $E_M$ also changes, so that the rotational speed of the motor 10 changes in response to the change in power supply voltage $E_o$. This is a distinct limitation of the conventional speed regulating device of the type described hereinbefore.

The Invention, FIGS. 7 through 10

Figure 7:
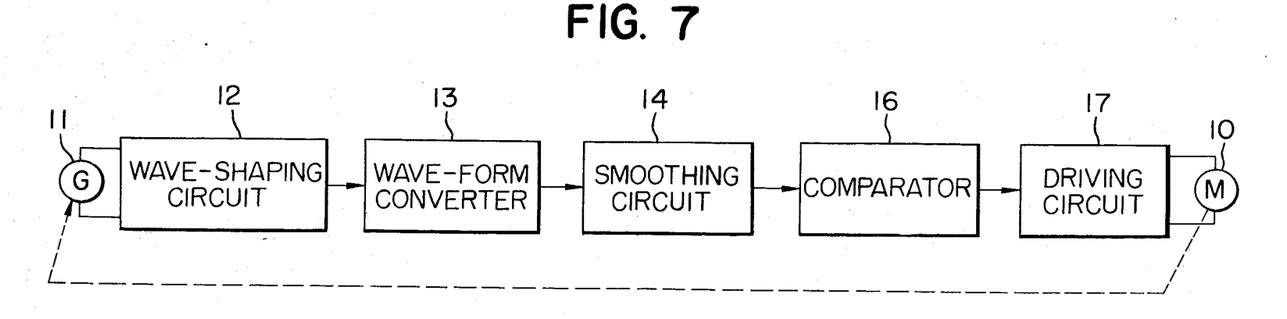
FIG. 7 is a block diagram of a first embodiment of a speed regulating device in accordance with the present invention.

First referring to FIG. 7, the first embodiment of a speed regulating device in accordance with the present invention comprises the motor 10, the generator 11, the waveshaping circuit 12, the waveform converter circuit 13, the smoothing circuit 14, (all of which are substantially similar in construction and mode of operation to those described above with reference to FIGS. 1 through 6), a comparator 16 and a driving circuit 17.

Figure 8:
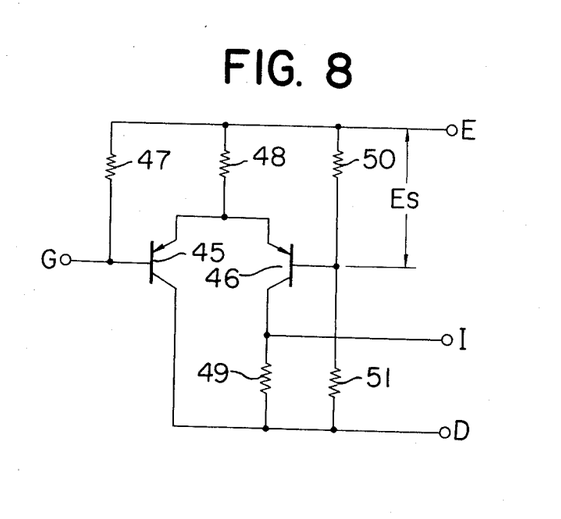
FIG. 8 is a detailed diagram of a comparator circuit shown in FIG. 7.

The details of the comparator 16 are shown in FIG. 8. Transistors 45 and 46 and resistors 47, 48 and 49 form a differential amplifier. An input terminal G is connected to the base of the transistor 45 and to the output terminal G of the smoothing circuit 14 (See FIG. 5). The emitters of both the transistors 45 and 46 are connected through the resistor 48 to the power supply terminal E. A voltage divider consisting of series-connected resistors 50 and 51 is interconnected between the power supply terminal E and a terminal D, and the junction therebetween is connected to the base of the transistor 46. The collector of the transistor 46 is connected to an output terminal I.

Figure 10:
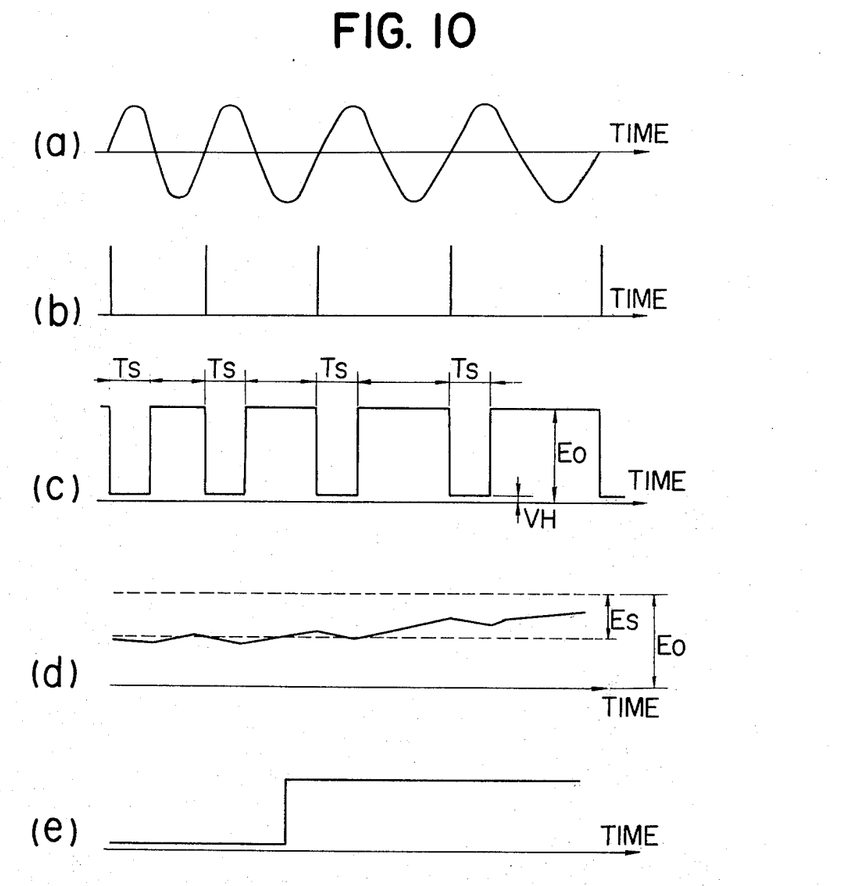
FIG. 10 shows waveforms obtained at various points in the speed regulator shown in FIG. 7.

Next the mode of operation will be described. When the potential at the input terminal G rises higher than a voltage derived by the division of the voltage applied to the terminal E by the voltage divider 50 and 51, the transistor 45 is turned off, while the transistor 46 is turned on, so that in response to the signal in waveform shown in FIG. 10(d) and applied to the input terminal G, the output signal having a waveform as indicated at (e) in FIG. 10 is derived from the output terminal I. In this circuit, the reference voltage $E_S$ is given by $$E_S = R_4 \cdot E_o / (R_4 + R_5) \tag{8}$$

where
$R_4$ and $R_5$ : values of resistors 50 and 51; and
$E_o$ : supply voltage.

The output from the comparator 16 is applied to the driving circuit 17.

Figure 9:
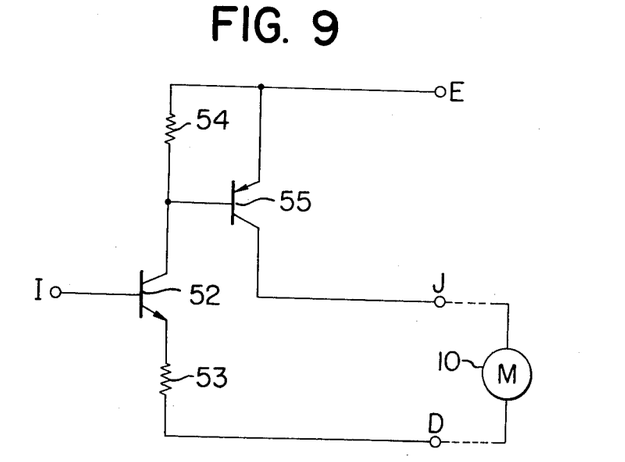
FIG. 9 is a detailed diagram of a driving circuit shown in FIG. 7.

The details of the driving circuit 17 are shown in FIG. 9. The output terminal I of the comparator 16 is connected to an input terminal I, which in turn is connected to the base of a transistor 52. The emitter of the transistor 52 is connected through a resistor 53 to a negative terminal D, while the collector of transistor 52 is connected through resistor 54 to the power supply terminal E and to the base of a transistor 55. The emitter of the transistor 55 is connected to the terminal E, while the collector is connected to an output terminal J. The motor 10 is connected between the output terminal J and the negative terminal D.

Next the mode of operation of the driving circuit 17 with the above construction will be described. When the potential at the input terminal I rises, the collector current of the transistor 52 increases, so that the base current of the transistor 55 also increases. As a result, the voltage across the motor 10 increases so that the rotational speed thereof also increased. On the other hand, when the potential at the input terminal I drops, the voltage across the motor 10 drops so that its rotational speed decreases.

Referring back to FIG. 7, the mode of overall operation of the first embodiment will be described. The output from the generator 11 which is operatively coupled to the motor 10 is applied to the input terminal of waveshaping circuit 12. The generator 11 and the waveshaping circuit 12 form a rotational speed detector. An output signal with a frequency, or first physical quantity, determined by upon the rotational speed of the motor 10, is applied to the waveform converter circuit 13 and is combined with a second physical quantity; that is, a time interval $T_S$, so that a rectangular waveform signal with an amplitude which changes in response to the change in supply voltage is derived, as indicated at $c$ in FIG. 10, and is converted by the smoothing circuit 14 into a second physical quantity, or $E_M$, given by Eq. (7). The second physical quantity is compared in the comparator 16 with the second reference physical quantity $E_S$, given by Eq. (8). In response to the output signal from the comparator 16 indicated at $e$ in FIG. 10, the driving circuit 17 insures that the motor 10 rotates at a constant speed.

More particularly, when the rotational speed of the motor 10 decreases due to a increase in load, the output signal from the generator 11 changes as indicated at $a$ in FIG. 10, so that the output signals indicated at $b$, $c$, $d$ and $e$ in FIG. 10 are derived from the waveshaping circuit 12, the waveform converter 13, the smoothing circuit 14 and the comparator 16. The second physical quantity $E_M$ exceeds the reference physical quantity $E_S$, so that the output voltage from the driving circuit 17 rises. As a result, the rotational speed of the motor 10 increases to a desired rate. Thus, if the loop gain of the control system in the speed regulating device is sufficiently high, the rotational speed of the motor 10 may be maintained substantially at a predetermined rate.

The rotational speed N of the motor 10 may be obtained as follows:

$$E_M = E_S \qquad (9)$$

Therefore, from Eqs. (5), (6), (8) and (9), we have $$N = \frac{R_4 \cdot E_o}{K \cdot T_S \cdot (R_4 + R_5)(E_o - V_H)} \qquad (10)$$

where $T_S$ is given by Eq. (3).

When Eq. (10) is compared with Eq. (7), it is seen that the variation in rotational speed N of the motor 10 in response to the change in supply voltage $E_o$ is considerably reduced as compared with the variation of the conventional speed regulating device shown in FIG. 1. In this embodiment, it is possible to construct the circuit so that the time interval $T_S$ of Eq. (3) will not change when the input voltage $E_o$ changes. When a series circuit consisting of a resistor and an element such as a diode having a saturation characteristic corresponding to the saturation voltage of the hook switch is inserted in place of the resistor 51 in FIG. 1, the voltage term of the numerator in Eq. (10) may be made equal to the voltage term of the denominator. Therefore, the variation in rotational speed of the motor 10 in response to the variation in supply voltage $E_o$ may be made zero.

Figure 11:
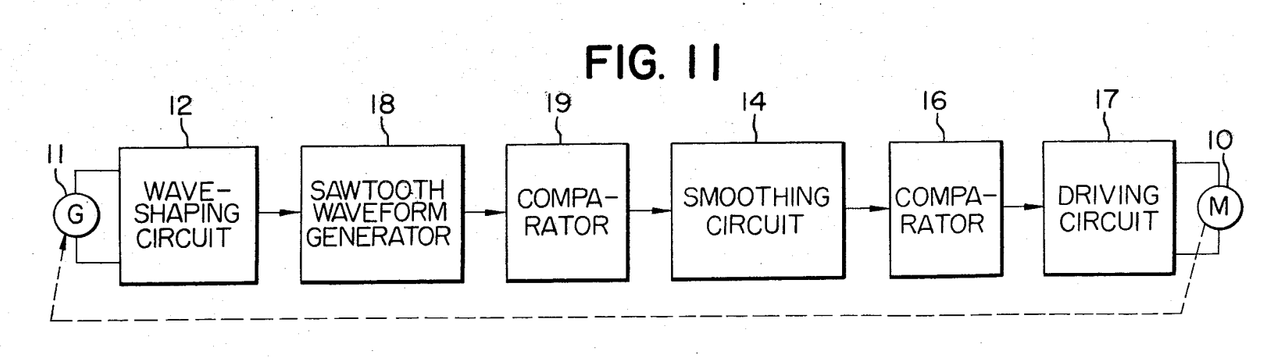
FIG. 11 is a block diagram of a second embodiment of the present invention.
Figure 12:
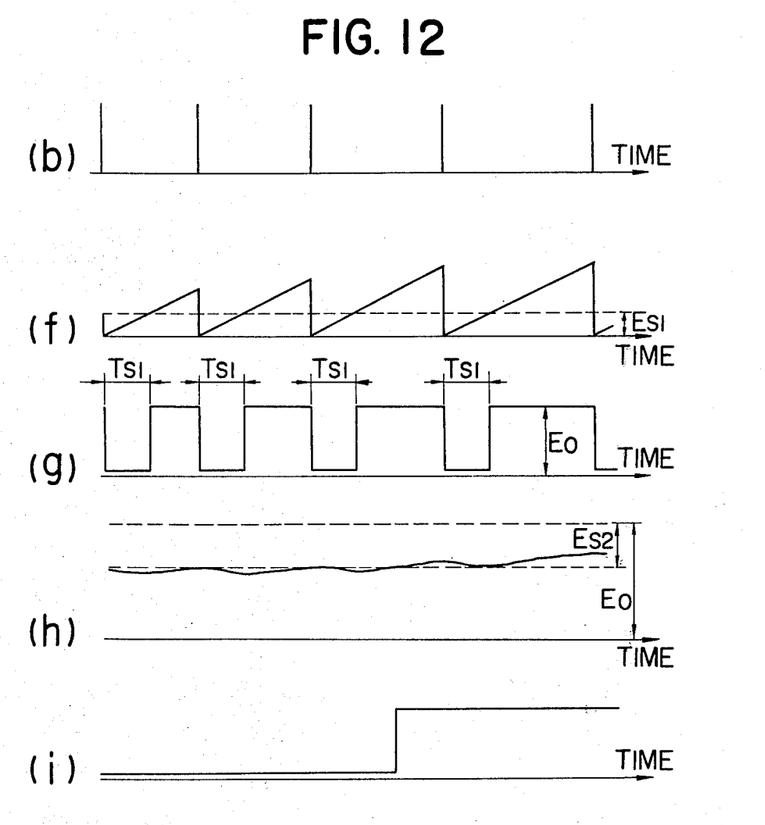
FIG. 12 shows waveforms obtained at various points in the speed regulator shown in FIG. 7.

Second Embodiment, FIGS. 11 and 12

Referring to FIG. 11, the generator 11 coupled to the motor 10 and the waveshaping circuit 12 form a rotational speed detector, and the output signal therefrom, as indicated at $b$ in FIG. 12, is applied to a sawtooth waveform generator 18. The output from the sawtooth waveform generator 18 indicated at $f$ in FIG. 12, is applied a comparator 19, to be compared with a reference voltage $E_{S1}$, so that the output signal as indicated at $g$ in FIG. 12 is derived from the comparator 19. The output signal from the comparator 19 consists of rectangular waveform pulses spaced apart from each other by a time interval $T_{S1}$, and with a frequency which changes depending upon the variation in supply voltage. The output signal is then smoothed by the smoothing circuit 14, as indicated by $h$ in FIG. 12. The output from the smoothing circuit 14 is compared with a reference voltage $E_{S2}$ in the comparator 16, so that the output signal as indicated at $i$ in FIG. 12 is derived. In response to the output signal from the comparator 16, the driving circuit 17 controls the motor 10 in the manner of the first embodiment described elsewhere.

In the second embodiment, the first physical quantity is a frequency determined in response to the rotational speed N of the motor 10; the first reference physical quantity is a reference voltages $E_{S1}$ or a predetermined time $T_{S1}$; the second physical quantity is the output from the smoothing circuit 14 which is derived by smoothing the rectangular waveform signal in which the pulses are spaced apart from each other by a predetermined time interval $T_{S1}$, and whose frequency is changed in response to the variation in supply voltage; and the second reference physical quantity is a reference voltage $E_{S2}$ derived by dividing the supply voltage.

Figure 13:
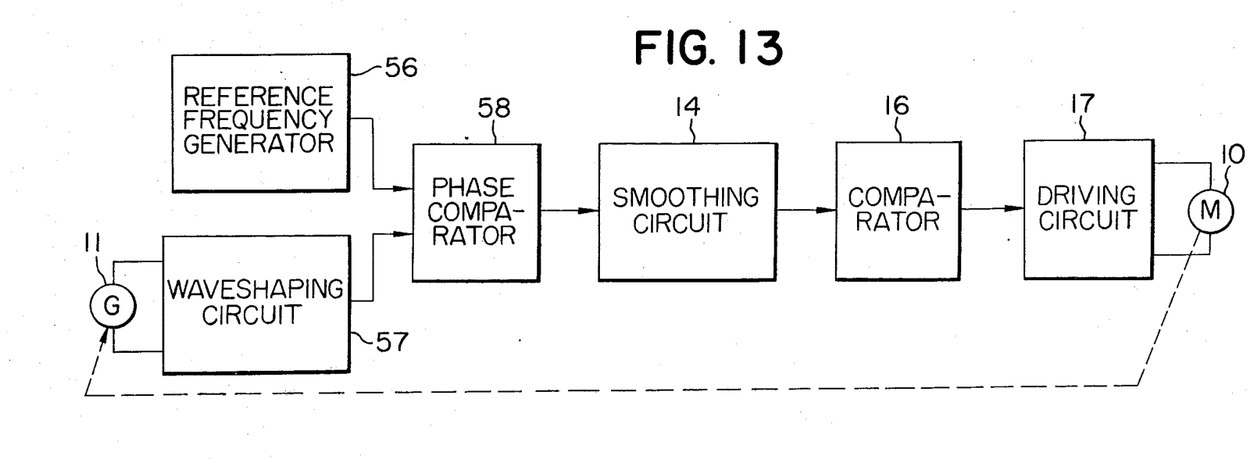
FIG. 13 is a block diagram of a third embodiment of the present invention.

Third Embodiment, FIG. 13

Referring to FIG. 13, the third embodiment of the present invention includes a reference frequency generator 56 which generates a reference frequency signal to be compared in phase in a phase comparator 58 with the output signal from a rotational speed detector, consisting of the generator 11 coupled to the motor 10 and a waveshaping circuit 57. The pulse modulated output signal from the comparator 58 is smoothed by the smoothing circuit 14, and the output signal from the smoothing circuit 14 is compared by the comparator 16 with the reference voltage $E_S$. In response to the output signal from the comparator 16, the driving circuit 17 controls the motor 10 in a motor substantially similar to that of the first or second embodiment described elsewhere.

In the third embodiment, the first physical quantity is a frequency which changes in response to the variation in rotational speed of the motor 10; the first reference physical quantity is a reference frequency $F_S$; the second physical quantity is the output from the smoothing circuit 14 which is derived by smoothing the pulse output signal whose frequency changes in response to the variation in supply voltage; and the second reference quantity is a reference voltage $E_S$ derived by dividing the supply voltage.

So far in the first, second and third embodiments have been described as controlling the motor, but it is to be understood that speed regulating devices in accordance with the present invention may be applied to other rotary machines, such as a spring motor utilizing electromagnetic brakes.

What is claimed is:

1. A speed regulating device for rotary machines powered by a supply voltage comprising
    a. means for obtaining from a rotational speed detector attached to a rotary machine a first time varying signal which is dependent upon the rotational speed of said rotary machine;
    b. means for combining said first time varying signal with a reference timing signal to generate a rectangular waveform signal whose amplitude changes in response to the variation in supply voltage;
    c. means for smoothing said rectangular waveform signal to derive a time varying DC voltage signal;
    d. means for comparing said time varying DC voltage signal with a reference DC voltage signal derived by dividing the supply voltage; and
    e. means operating in response to the output signal from said comparator means, for controlling said rotary machine to rotate at predetermined rate.

2. A speed regulating device as set forth in claim 1 wherein said means for deriving said time varying signal is a waveshaping circuit which, in response to the output from a generator coupled to said rotary machine generates pulses whose pulse repetition rate changes in response to the change in rotational speed of said rotary machine.

3. A speed regulating device as set forth in claim 1 wherein said first time varying signal represents pulses whose repetition rate changes in response to the change in rotational speed of said rotary machine; and said rectangular waveform signal generating means is a waveform converter circuit which generates the rectangular waveform signal whose amplitude changes in response to the variation in supply voltage.

4. A speed regulating device as set forth in claim 1 wherein said time varying DC voltage signal quantity is derived by smoothing said rectangular waveform signal; and said comparating means comprises a comparator circuit for comparing the smoothed output signal with a reference voltage derived by the division of the supply voltage.

5. A speed regulating device as set forth in claim 1 wherein said first time varying signal represents pulses whose repetition rate changes in response to the variation in rotational speed of said rotary machine; and said rectangular waveform signal generating means comprises a. A sawtooth waveform generator for generating a sawtooth waveform signal whose frequency is dependent upon said pulse repetition rate, and b. a comparator for comparing the output signal from said sawtooth waveform generator with a reference voltage to generate a rectangular waveform signal having predetermined TIME interval and an amplitude which changes in response to the frequency of said output signal from said sawtooth waveform generator and to the variation in supply voltage.

6. A speed regulating device for rotary machines driven by a supply voltage comprising a. a waveshaping circuit operating in response to the output from a generator coupled to a rotary machine for generating pulses whose repetition rate is dependent upon the rotational speed of said rotary machine;

b. a reference frequency generator for generating a reference frequency output signal;

c. a phase comparator for comparing in phase the output from said waveshaping circuit with the reference output from said reference frequency generator;

d. a smoothing circuit for smoothing the output from said phase comparator;

e. a comparator circuit for comparing the output from said smoothing circuit with a reference voltage derived by the division of the supply voltage; and f. a driving circuit for controlling said rotary machine to rotate at a predetermined rate in response to the output from said comparator.

* * * * *

UNITED STATES PATENT OFFICE
CERTIFICATE OF CORRECTION

Patent No. 4,015,180　　　　　　　　　Dated March 29, 1977

Inventor(s)　　　Yoshio Tetsugu, et al

It is certified that error appears in the above-identified patent and that said Letters Patent are hereby corrected as shown below:

Column 1, line 64: After "frequency," --or-- should be added.

Column 3, line 1: "te" should be --the--.

line 31: "29" should be --19--.

line 36: "29; the" should be --29. The--.

Column 4, line 62: The last word in the line should be --the--

Column 5, in equation no. "(7)", within the braces: "$R_3$" should be --$R_1$--.

Column 6, line 59: "upon" should be deleted.

Column 7, line 55: There should be a comma after "18".

UNITED STATES PATENT OFFICE
CERTIFICATE OF CORRECTION

Patent No. 4,015,180  Dated March 29, 1977

Inventor(s) Yoshio Tetsugu, et al

It is certified that error appears in the above-identified patent and that said Letters Patent are hereby corrected as shown below:

Column 8, line 29: "motor" (2nd occurrence) should be
--manner--.

Signed and Sealed this

Fifteenth Day of November 1977

[SEAL]

Attest:

RUTH C. MASON  
*Attesting Officer*

LUTRELLE F. PARKER  
*Acting Commissioner of Patents and Trademarks*